(12) United States Patent
Khan

(10) Patent No.: US 11,876,769 B2
(45) Date of Patent: Jan. 16, 2024

(54) SYSTEM AND METHOD FOR GENERATING RECOMMENDATIONS AND TRANSFORMING A MESSAGE AND PROVIDING A REDACTED REPLY SERVICE

(71) Applicant: Zafar Khan, Redondo Beach, CA (US)

(72) Inventor: Zafar Khan, Redondo Beach, CA (US)

( * ) Notice: Subject to any disclaimer, the term of this patent is extended or adjusted under 35 U.S.C. 154(b) by 0 days.

(21) Appl. No.: 17/304,305

(22) Filed: Jun. 17, 2021

(65) Prior Publication Data
US 2021/0400008 A1    Dec. 23, 2021

Related U.S. Application Data

(60) Provisional application No. 62/705,240, filed on Jun. 17, 2020.

(51) Int. Cl.
| | |
|---|---|
| H04L 51/48 | (2022.01) |
| H04L 51/08 | (2022.01) |
| H04L 51/063 | (2022.01) |
| H04L 51/18 | (2022.01) |
| H04L 51/23 | (2022.01) |
| H04L 51/212 | (2022.01) |
| H04L 51/234 | (2022.01) |

(52) U.S. Cl.
CPC ............ *H04L 51/48* (2022.05); *H04L 51/063* (2013.01); *H04L 51/08* (2013.01); *H04L 51/18* (2013.01); *H04L 51/212* (2022.05); *H04L 51/23* (2022.05); *H04L 51/234* (2022.05)

(58) Field of Classification Search
CPC ....... H04L 51/28; H04L 51/063; H04L 51/08; H04L 51/12; H04L 51/18; H04L 51/30; H04L 51/34; H04L 51/48; H04L 51/212; H04L 51/23; H04L 51/234; H04L 51/066
USPC .............................................. 709/206
See application file for complete search history.

(56) References Cited

U.S. PATENT DOCUMENTS

| | | | |
|---|---|---|---|
| 7,890,860 B1* | 2/2011 | Thrasher ............ | G06F 40/166 715/260 |
| 2007/0067394 A1* | 3/2007 | Adams ................ | G06Q 10/107 709/206 |
| 2007/0124392 A1* | 5/2007 | Goldberg ............ | G06Q 10/107 709/206 |
| 2010/0198931 A1* | 8/2010 | Pocklington ........ | G06Q 10/107 709/206 |
| 2010/0223341 A1* | 9/2010 | Manolescu .......... | H04L 51/063 709/206 |
| 2015/0113080 A1* | 4/2015 | Faulk .................. | G06Q 10/107 709/206 |
| 2016/0165600 A1* | 6/2016 | Choi .................... | H04L 5/0055 370/336 |
| 2016/0294745 A1* | 10/2016 | Boothroyd ........... | H04L 51/38 |
| 2016/0342583 A1* | 11/2016 | Cunico ................ | H04L 51/063 |

* cited by examiner

*Primary Examiner* — Johnny B Aguiar
(74) *Attorney, Agent, or Firm* — Fitzgerald IP Law; John K Fitzgerald, Esq.

(57) ABSTRACT

A method and system for generating recommendations to a user based on content in the headers and body of an electronic message and transforming the email accordingly, and also providing a redacted reply service to ensure that a user hitting "reply all" cannot inadvertently unmask the identity of bcc (blind carbon copy) recipients of the original electronic message.

13 Claims, 8 Drawing Sheets

Standard Rules

| Search Area | How to Compare | Text | Expression (Format) | Outlook Prompt | RMail Function | Rule Description |
|---|---|---|---|---|---|---|
| Subject | Contains | confidential | | Recommend | Encrypt Transmission | Processes via RMail if subject contains with word |
| Subject | Contains | private | | Recommend | Encrypt Transmission | Processes via RMail if subject contains with word |
| Subject | Contains the Word... | policy number | | Require | Encrypt Transmission | Processes via RMail if subject contains with word combination |
| Subject | Contains the Word... | medical record | | Require | Encrypt Transmission | Processes via RMail if subject contains with word combination |
| Subject | Contains the Word... | policy number | | Require | Encrypt Transmission | Processes via RMail if subject contains with word combination |
| Message Body | Contains | fiduciary | | Request | Encrypt Transmission | Processes via RMail if message body contains with word combina... |
| Message Body | Matches Regular Exp. | | US Social Security Format; | Require | Encrypt Transmission | Processes via RMail if message body contains with word combina... |
| Message Body | Matches Regular Exp. | | Visa/mc/discover | Request | Encrypt Transmission | Processes via RMail if message body contains with word combina... |
| Message Body | Matches Regular Exp. | | Amex | Request | Encrypt Transmission | Processes via RMail if message body contains the number formats |
| Header - Attach... | Contains | | Confidential | Request | Encrypt Transmission | Processes via RMail if message body contains the number formats |
| Header - Attach... | Contains | | includes "pdf" | Recommend | Encrypt Transmission | Processes via RMail if message attachment name contains the word |
| Header - Attach... | Contains | | includes "csv" | Recommend | Encrypt Transmission | Processes via RMail if message attachment name contains the word |
| Header - Attach... | Contains | | includes "xls" | Request | Encrypt Transmission | Processes via RMail if message attachment name contains the word |
| Subject | Contains | funding | | Request | Encrypt Transmission | Processes via RMail if subject contains with word combination |
| Subject | Contains | wire transfer | | Request | Encrypt Transmission | Processes via RMail if subject contains with word combination |
| Message Body | Contains the Word... | wire transfer | | Request | Encrypt Transmission | Processes via RMail if message body contains with word combina... |
| Header - Attach... | Contains the Word... | wire transfer | | Request | Encrypt Transmission | Processes via RMail if message attachment name contains the word. |
| Header | Contains | | important header | Recommend | Track Prove | Processes via RMail if message header flag set according to format |
| Subject | Contains | invoice | | Recommend | Track Prove | Processes via RMail if subject contains with word |
| Subject | Contains | important | | Recommend | Track Prove | Processes via RMail if subject contains with word |
| Subject | Contains | notice | | Recommend | Track Prove | Processes via RMail if subject contains with word |
| Subject | Contains | urgent | | Recommend | Track Prove | Processes via RMail if subject contains with word |
| Subject | Contains | past due | | Request | Track Prove | Processes via RMail if subject contains with word |
| Message Body | Contains the Word... | invoice | | Request | Track Prove | Processes via RMail if message body contains with word combina... |
| Header - Attach... | Contains | quote | | Recommend | Track Prove | Processes via RMail if message attachment name contains the word |
| Recipient Address | Contains | | | Recommend | Encrypt Transmission | |
| Recipient Address | Domains Contains | | | Recommend | Encrypt Transmission | |

Rule Action Order Of Priority

| Name | Action | Rule Priority |
|---|---|---|
| A | Encrypt Message Level | If A and B and C are triggered, send Action A |
| B | Encrypt Transmission | If B and C are triggered, send Action B |
| C | Track Prove | Compatible with all |

FIG. 2

SYSTEM AND METHOD FOR GENERATING RECOMMENDATIONS AND TRANSFORMING A MESSAGE AND PROVIDING A REDACTED REPLY SERVICE

FIELD

This disclosure relates to a system to generate recommendations and transform a message, electronic message security within the category of private delivery of electronic messages, and the sub-category of privacy compliance. More particularly, the disclosure relates to electronic message security within the category of private delivery of electronic messages, and the sub-category of privacy compliance, in terms of protecting a sender or sender organization against claims of a data breach due to a claim that a sent message was not sent securely in terms of privacy; and to provide additional recommendations or requirements on how an electronic messages is to be processed based on the message structure, content, or anticipated desire of sender. The disclosure also relates to a system and method for providing a redacted reply service for an email message.

BACKGROUND

While a normal email and electronic message system user knows how to send, receive, read, reply-to, and forward an electronic message (email refers to any electronic message transmitted using electronic message transmission protocols), a normal email user neither knows how to or when to transmit an email in a more secure or private manner, or with other important special processing. A normal email user may not even know about the existence of functionality that could be applied a message to treat the message specially. A normal email user may know about the existence of functionality that could be applied a message to treat the message specially and know when they are supposed to use it but forget to select that special functionality for a specific message.

An email administrator may want to have a way to make recommendations, requests, or require normal email senders to use special functionality on a particular message.

A training department may want an automated way to teach users when they should or must treat the message specially.

More advanced email users may configure their email program to automatically filter email to be placed in certain folders, or mark email with various levels of importance. Even more advanced email users may set up systems to transmit email in a more private manner than in a standard email transmission; a standard email transmission being defined as an electronic message transmission sent using electronic messaging protocols such as Simple Mail Transport Protocol (SMTP), Extended Simple Mail Transport Protocol (ESMTP), Short Message Service (SMS), Short Message Peer-to-Peer (SMPP), Multimedia Messaging Service (MMS), Hypertext Transfer Protocol (HTTP), Secure Hypertext Transfer Protocol (HTTPS), and combinations such as with Secure Sockets Layer (SSL), Transport Layer Security (TLS), and others.

Some of these email users or their email operators may install third party programs or encryption keys inside their existing email program to assist them in dealing with the various known and common security threats associated with email. Users (senders of email and/or recipients) or email system administrators may add software or enable settings at the email server, email gateway, or email user interface (commonly referred to as "Email Client"). These add-on software programs may add options to transmit messages in a more private manner than using standard messaging protocols. Some users may opt to upload their message to a secure server that would send a link to retrieve or view the message, and some may opt to compose their message in a secure program accessed securely in a web browser and then transmit. Some systems may send using secure application programming interfaces including protocols such as Simple Object Access Protocol (SOAP), Representational State Transfer (REST), Electronic Data Interchange (EDI) exchange protocols, among others.

There are a variety of methods of transmitting messages in a more private manner than using standard email transmission protocols. Some of these methods use Pretty Good Privacy (PGP), Public Key Infrastructure (PKI), Advanced Encryption Standard (AES) 256-Bit Portable Document Format (PDF), Link-Retrieval, Hypertext Markup Language (HTML) Wrappers, and the like. with or without sending with a secure connection like TLS, SSL, or HTTPS. There are other protocols in secure messaging systems including EDI, SMS, MMS, and the like.

There are a variety for security gateway servers that can filter for message content after the user has sent the message and automatically apply extra processing (i.e. encrypting, preventing delivery), based on the message content and the service policies.

There are a variety of user training tools that overlay on top of an email program and guide a user through a first-use feature tour, or invite users to join training sessions or watch training videos.

The problem with current email systems are:

Current Filtering for "Missing Attachment": the rules applied based on the current filtering provides for a user warning or notification, but does not undertake an action that will transform the message to solve the problem warned. There is no active change, just a passive reminder.

Security Gateway Content Policy Filters: these apply functionality to the message based on policies set by an administrator, without any sender user awareness that such policy is being applied, and thus the functionality applied needs to be over estimating the need. For example, an organization would prefer to encrypt more messages automatically then miss encrypting a message that should have been encrypted. Over estimating may be okay for some features like encrypting, but not for others, like sending for e-signature or performing advanced functionality.

While programs have pop-ups and reminders for end users, they are limited to basic awareness and don't take action. Training programs take a lot of user time and may occur at certain periods of time or upon first exposure but there are no easy ways to automate training for users to make them learn about the availability of certain service features plus when to use them, that occur in real time as users are using services.

While a normal email and electronic message system user knows how to send, receive, read, reply-to, and forward an electronic message (email refers to any electronic message transmitted using electronic message transmission protocols), a normal email user neither knows how to or when to transmit an email in a more secure or private manner, or with other important special processing. A normal email user may not even know about the existence of functionality that could be applied a message to treat the message specially. A normal email user may know about the existence of functionality that could be applied a message to treat the message specially and know when they are supposed to use it but forget to select that special functionality for a specific message.

An email administrator may want to have a way to make recommendations, requests, or require normal email senders to use special functionality on a particular message.

A training department may want an automated way to teach users when they should or must treat the message specially.

More advanced email users may configure their email program to automatically filter email to be placed in certain folders, or mark email with various levels of importance. Even more advanced email users may set up systems to transmit email in a more private manner than in a standard email transmission; a standard email transmission being defined as an electronic message transmission sent using electronic messaging protocols such as SMTP, ESMTP, SMS, SMPP, MMS, HTTP, HTTPS, and combinations such as with SSL, TLS, and others.

Some of these email users or their email operators may install third party programs or encryption keys inside their existing email program to assist them in dealing with the various known and common security threats associated with email. Users (senders of email and/or recipients) or email system administrators may add software or enable settings at the email server, email gateway, or email user interface (commonly referred to as "Email Client"). These add-on software programs may add options to transmit messages in a more private manner than using standard messaging protocols. Some users may opt to upload their message to a secure server that would send a link to retrieve or view the message, and some may opt to compose their message in a secure program accessed securely in a web browser and then transmit. Some systems may send using secure application programming interfaces including protocols such as SOAP, REST, EDI exchange protocols, among others.

There are a variety of methods of transmitting messages in a more private manner than using standard email transmission protocols. Some of these methods use PGP, PKI, AES 256-Bit PDF, Link-Retrieval, HTML Wrappers, and the like. with or without sending with a secure connection like TLS, SSL, or HTTPS. There are other protocols in secure messaging systems including EDI, SMS, MMS, and the like.

There are a variety for security gateway servers that can filter for message content after the user has sent the message and automatically apply extra processing (i.e. encrypting, preventing delivery), based on the message content and the service policies.

There are a variety of user training tools that overlay on top of an email program and guide a user through a first-use feature tour, or invite users to join training sessions or watch training videos.

The problem with current email systems are:

Current Filtering for "Missing Attachment": the rules applied based on the current filtering provides for a user warning or notification, but does not undertake an action that will transform the message to solve the problem warned. There is no active change, just a passive reminder.

Security Gateway Content Policy Filters: these apply functionality to the message based on policies set by an administrator, without any sender user awareness that such policy is being applied, and thus the functionality applied needs to be over estimating the need. For example, an organization would prefer to encrypt more messages automatically then miss encrypting a message that should have been encrypted. Over estimating may be okay for some features like encrypting, but not for others, like sending for e-signature or performing advanced functionality.

While programs have pop-ups and reminders for end users, they are limited to basic awareness and don't take action. Training programs take a lot of user time and may occur at certain periods of time or upon first exposure but there are no easy ways to automate training for users to make them learn about the availability of certain service features plus when to use them, that occur in real time as users are using services.

What is needed is a means for a sender or sending organization to have prompts that provide them with recommendations, requests to use, or requirements to use certain functionality that they can opt to continue use and applying the recommendation or cancel or change the message. These recommendations would not be simple prompts or reminders, but would actually trigger technology that would implement the recommendation automatically. And, these recommendations, requests, or requirements could be static, loaded onto their system, dynamic, meaning modifiable by an administrator, or predictive, updating based on learning from the user's patterns and therefore be unique to each user and not uniform across an organization.

Exampled of triggering technology that would implement the recommendation automatically would be to apply certain types of message encryption based on the content of the message, processing the message in a transformed manner to automatically enable the recipient to receive it as a link, or a link to trigger a recipient e-signature process, or redacting content from the message, or changing the message recipient addresses structure, or other.

The problem with current email systems are that sometimes BCC (blind carbon copy) recipients REPLY ALL and this then exposes the TO and CC (carbon copy) recipients to the fact that there was a hidden BCC recipient and can cause embarrassment; or worse, the BCC may reply-all with a personal note to the FROM address not realizing all the TO and CC addresses will see the message, and can cause embarrassment.

Further, the Sender adds BCC recipients on messages with other TO and CC recipients AND a SIDE NOTE for only the BCC person. The NOTE, need to apply redacted BCC to CC addresses as an option to prevent the REPLY ALL.

Therefore, there is a need for a system and method to provide a redacted reply service for an email message that alleviates the aforementioned drawbacks. Additionally, there is a need for a system and method to generate recommendations and transform a message that alleviates the aforementioned drawbacks.

SUMMARY

In its broadest aspect, the present disclosure includes a system to generate recommendations and transform a message. In another broad aspect, the disclosure includes a system and a method for providing a redacted reply service for an email message.

Another aspect of the present disclosure provides a system and a method to provide a sender or sender organization visibility and proof of fact of encrypted delivery for peace of mind or protection in the case of privacy compliance audit, and visibility and proof of fact of receipt of an inbound message having been transmitted with encrypted delivery from the sender or sender agent.

Still another aspect of the present disclosure provides a system and method providing audit-ready records to verify secure delivery of electronic messages to better manage messaging policies and to provide readily accessible information in case of a data privacy compliance audit.

Yet another aspect of the present disclosure is to provide a system to offer a sender or sending organization (or a receiver or a receiver replying) with a record of fact of encrypted delivery of an electronic message from one endpoint to a receiving endpoint.

Still another aspect of the present disclosure is to provide a system for third parties to authenticate the record of fact of private delivery.

Another aspect of the present disclosure provides a system and method for creating a record to provide the sender of a message opportunities to make a reply to the sender's message returned in a more private manner (so as not to expose the content or a part of the sender's original information sent if contained in the reply message thread).

Still another aspect of the present disclosure provides a system and method for the sender or third parties to authenticate the record of fact of certain content sent having been redacted or removed from a recipient's reply message thread.

Yet another aspect of the present disclosure provides a system and method for adding a link to the transmitted reformatted message that includes reply control information that limits the content that a reply message based on the transmitted reformatted message may contain.

Still another aspect of the present disclosure provides a system and method for controlling information and prevents the reply from including the information associated with the removed content.

In still another aspect, the present disclosure provides a system and method for providing a redacted reply service for an email message.

In another aspect, the disclosure includes a system that presents recommendations to an electronic messaging system user that, if the recommendation is accepted, automatically transforms the message to implement the recommendation, comprising; a processor or server programmed using software commands to: trigger recommendation in accordance with pre-set rules associated with message destinations, content, headers, or context, the recommendation happening at the user or system that interacts with the user, the pre-set rules being created or modified by the user, a remote administrator, or by machine learning from an external system to the user based on past user behaviors or messaging interactions, and to transform the message at the user or on a system external to the user before reaching the recipient destination, examples of transformation being to send a message structured to capture a recipient's electronic signature, applying different types of message encryption, redacting content from the message or disabling the reply-all possibility if BCC addresses are present, or other.

In yet another aspect, the system presents a request of a trainer or system administrator to the user in a way that trains the user on the requested transformation of the particular message based on the message destinations, content, headers or context, with the option for the user to accept and send with the requested or not.

In still another aspect, the system presents requirements to the user in a way that trains the user on the required transformation of the particular message based on the message destinations, content, headers or context, with the option for the user to accept the requirement and if not be forced to cancel the send. In another aspect, the message is processed based on the recommendation if accepted, request if accepted, or requirement if sent. In still another aspect, the system is configured to learn and adapt based on machine learning or analysis of each user patterns based on messages sent.

In yet another aspect, the system, if recipient fields (or addresses or other) for example, if there is a CC or BCC in the message, and other addresses to the same message, the processor or server is programmed to transform the message such that all the addresses other than the From address are removed from the message headers and are populated as a text attachment or into re-formatted message body with the location to place the removed recipient addresses, so that each recipient cannot reply-all to the removed addresses but can visibly see that the original message was sent to the other addresses. In another aspect, all or a portion of the addresses, based on a category of addresses (i.e. internal company vs external domain) are removed. In still another aspect, the restructuring of the message format, the processor or server is programmed to add a link in the restructured message associated with each recipient address.

In yet another aspect, the message link records, from a system to the recipient and user, information about delivery of the message to each of the removed addresses, so the recipient that receives the transformed message can see who each recipient was, along with having assurance of successful delivery with a display of actual delivery to each of the recipients that display from information at the link associated with each recipient that was redacted from the message headers.

Other features and advantages of the present disclosure will become apparent from the following detailed description, taken in conjunction with the accompanying drawings, which illustrate, by way of example, the principles of the disclosure.

BRIEF DESCRIPTION OF THE DRAWINGS

A system and method to generate recommendations and transform a message of the present disclosure will now be described with the help of the accompanying drawing, in which:

FIG. 2 is an example of the rules stored in a repository, in accordance with FIG. 1;

LIST OF REFERENCE NUMERALS

Figure 1:
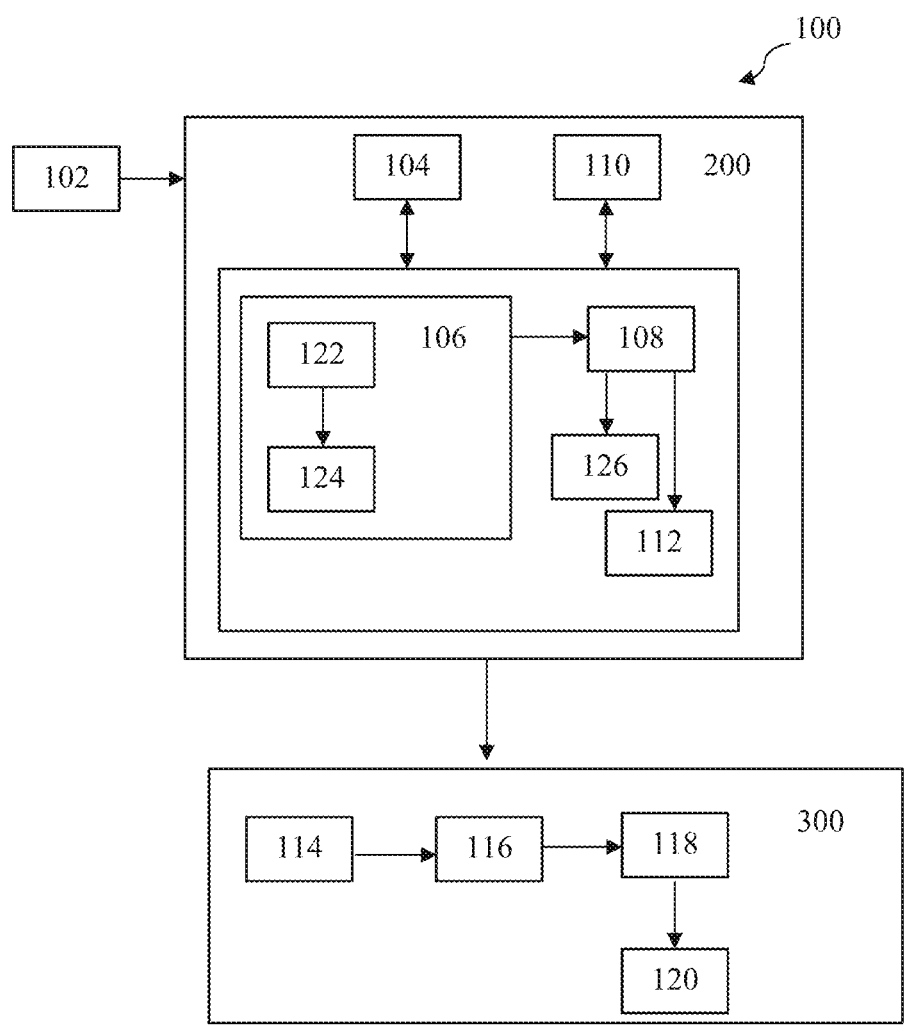
FIG. 1 is a schematic diagram of a system to generate recommendations and transform a message, in accordance with an embodiment of the present disclosure.
Figure 3A:
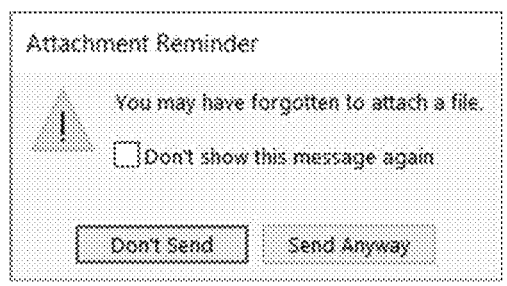
FIGS. 3A-3G illustrate the screenshots of the system, in accordance with FIG. 1.
Figure 3B:
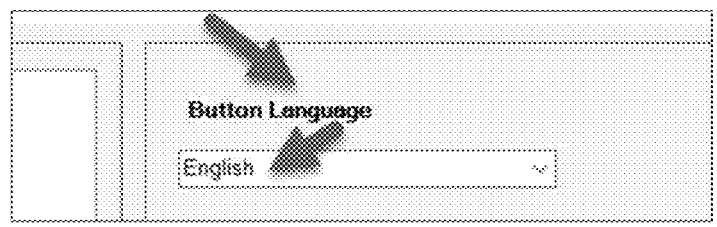
Figure 3C:
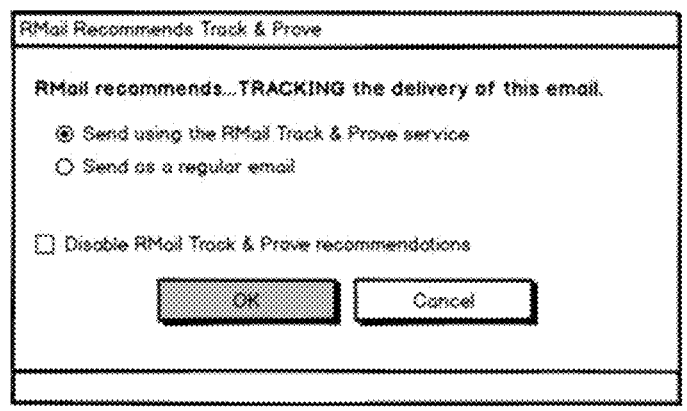
Figure 3D:
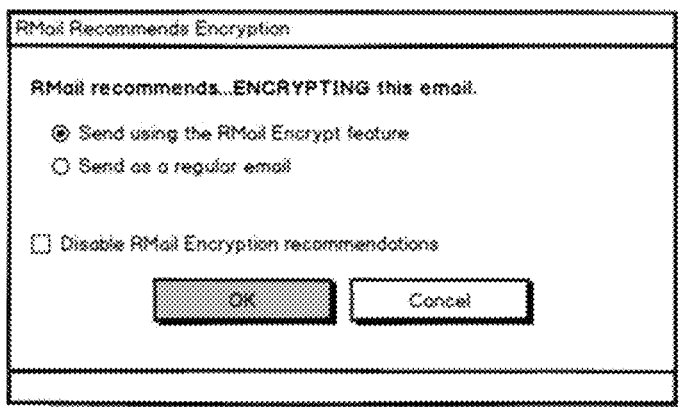
Figure 3E:
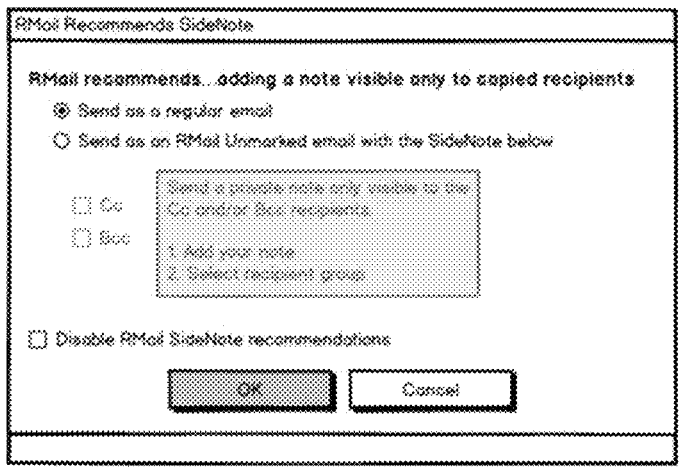
Figure 3F:
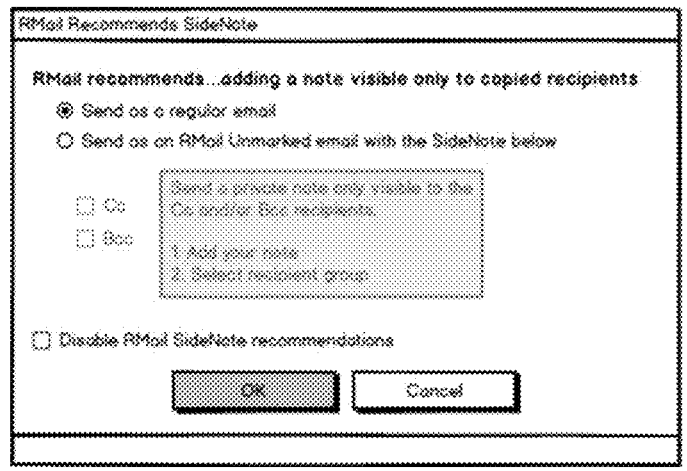
Figure 3G:
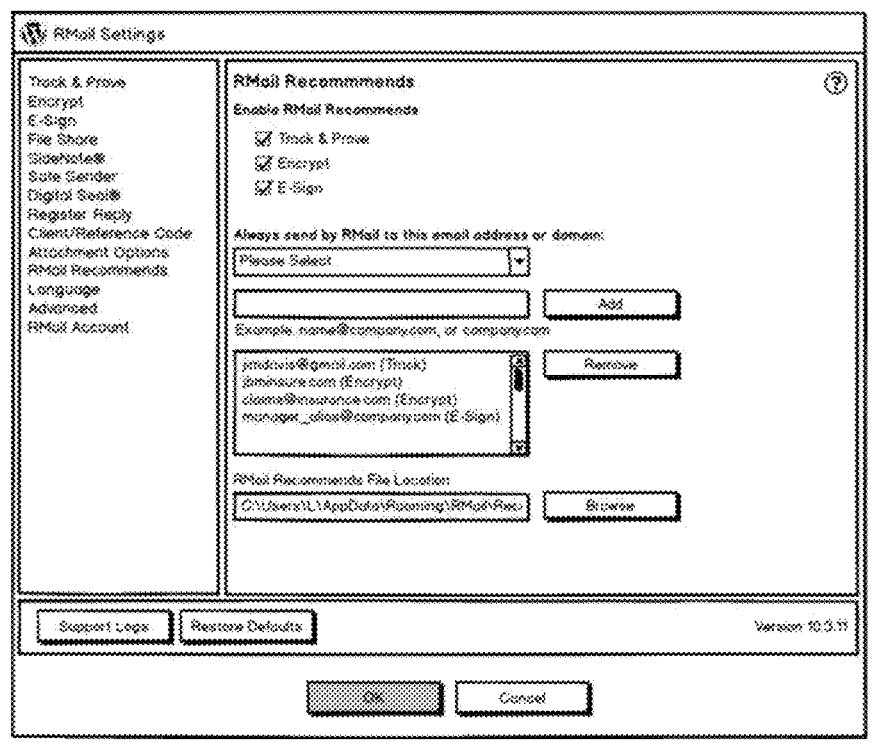

100—System
102—input module
104—first repository
106—recommendation module
108—transformation module
110—first communication module
112—functionality module
114—second communication module
116—second repository 118—editing module
120—analyser
122—matching module
124—prompt generator
126—replacing module
200—sender server
300—recipient server
400—System
402—input module
404—repository
406—first communication module
408—transformation module
410—edit module
412—second communication module
414—message module
500—sender server
600—recipient server

DETAILED DESCRIPTION OF THE
PREFERRED EMBODIMENTS

The following detailed description and examples are provided for the purpose of non-exhaustively describing some, but not necessarily all, examples or embodiments of the disclosure, and shall not limit the scope of the disclosure in any way.

Embodiments, of the present disclosure, will now be described with reference to the accompanying drawing.

Embodiments are provided so as to thoroughly and fully convey the scope of the present disclosure to a person skilled in the art. Numerous details are set forth, relating to specific components, and methods, to provide a complete understanding of embodiments of the present disclosure. It will be apparent to a person skilled in the art that the details provided in the embodiments should not be construed to limit the scope of the present disclosure. In some embodiments, well-known processes, well-known apparatus, structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "including," and "having," are open ended transitional phrases and therefore specify the presence of stated features, integers, steps, operations, elements and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

Mail assumed electronic format in 1965 and was given the name "Email". Email started as a way for multiple users of a time-sharing mainframe computer to communicate with each other. Email was quickly extended to become 'network email', allowing users to pass messages between different computers by at least 1966. Email today has become a communications tool that is simple enough for individuals to use regardless of their level of technical knowledge or understanding of how email works.

Today, email is often relied up for important communications among people and used to instruct people to do things or transmit sensitive financial, health-related, strategic, or legal information that a sender may not want to be available to parties other than the email recipient.

In many states, countries, and industries, there are regulations that require senders of certain information to send the information using systems that transmit the electronic message in a manner more private than standard email transmissions. One example is the United States (US) health care privacy regulation entitled, Health Insurance Portability and Accountability Act of 1996 (HIPAA) in the United States that provides data privacy and security provisions for safeguarding medical information. Another example is the European General Data Protection Regulation (GDPR) which includes provisions for email privacy compliance. GDPR defines what is to be achieved with compliance rather than how the requirements should be fulfilled. Consequently, it does not state a requirement to use a specific method of encrypting email, but it does require the handler of consumer non-public and personal information to maintain not only privacy of that information, but also the ability to demonstrate compliance with the privacy requirements.

While a normal email and electronic message system user knows how to send, receive, read, reply-to, and forward an electronic message (email refers to any electronic message transmitted using electronic message transmission protocols), a normal email user neither knows how to transmit an email in a more secure or private manner, nor knows how to verify if a message is to be sent or was sent using a more secure or private manner as compared to a standard email. Upon receiving an email, a normal email user would not know how to verify if that email was received using a secure transmission or encrypted transmission. A normal email user will not know how to prevent a recipient in receipt of the content of their sent secure transmission, to prevent them from replying insecurely and exposing their originally sent content that may be in the email thread.

More advanced email users may configure their email program to automatically filter email to be placed in certain folders, or mark email with various levels of importance. Even more advanced email users may set up systems to transmit email in a more private manner than in a standard email transmission; a standard email transmission being defined as an electronic message transmission sent using electronic messaging protocols such as SMTP, ESMTP, SMS, SMPP, MMS, HTTP, HTTPS, and combinations such as with SSL, TLS, and others.

Some of these email users or their email operator may install third party programs or encryption keys inside their existing email program to assist them in dealing with the various known and common security threats associated with email. Users (senders of email and/or recipients) or email system administrators may add software or enable settings at the email server, email gateway, or email user interface (commonly referred to as "Email Client"). These add-on software programs may add options to transmit messages in a more private manner that using standard messaging protocols. Some user may opt to upload their message to a secure server that would send a link to retrieve or view the message, and some may opt to compose their message in a secure program accessed securely in a web browser and then transmit. Some systems may send using secure application programming interfaces including protocols such as SOAP, REST, EDI exchange protocols, among others.

There are a variety of methods of transmitting messages in a more private manner than using standard email transmission protocols. Some of these methods use PGP, PKI, AES 256-Bit PDF, Link-Retrieval, HTML Wrappers, and the like. with or without sending with a secure connection like TLS, SSL, or HTTPS. There are other protocols in secure messaging systems including EDI, SMS, MMS, and the like. This discussion focuses on certain types of email system implementation, but the problems and the application of the invention is not limited to those.

Some common methods of encrypting transmission of electronic messages are summarized as follows:

PKI: Exchange of public encryption keys generated by sender and receiver digital certificates, shared between sender and receiver prior to sending messages. These "keys" are often stored in the Microsoft® Outlook® email program. Use generally requires sender and receiver to have an advanced email program such as Microsoft Outlook full desktop installation or Lotus® Notes®; generally, not Gmail®, Outlook®.com, or web email programs.

PGP: Exchange of keys generated by sender and receiver. Generally, sender and receiver need email programs that are configured to manage the key exchange, or sophistication among users to deal with this type of encryption. Some services attempt to make this easier to use.

PDF: AES 128-bit or 256-bit PDF encryption, where the message is printed into PDF format, the attachments are embedded in their native format, and the PDF serves as an encrypted wrapper for the message body and all attachments. The encrypted PDF file is attached to the email delivered to the recipient, and the message remains encrypted inside the recipient inbox while it is in the encrypted PDF file attachment.

TLS: Transport layer security, connecting from sender server to recipient server via a secure encrypted transmission. This only secures the message to the recipient server and requires recipient servers to be configured to operate with this option (which is not ubiquitous or certain). Further, there are various iterations of TLS, starting with the predecessor protocol Secure Sockets Layer (SSL), TLS 1.0, TLS 1.1, TLS 1.2, and TLS 1.3, and higher.

Link Retrieval: Store and forward systems where the sender sends an email, it is stored at an intermediate server and that intermediate server sends an email with a link to retrieve the message; the link often includes a request for the recipient to sign-up for an account, go through several required steps, all needed to view and download the sent message. This requires storage of the message by third parties while waiting for the recipient to download and go through the steps to retrieve.

HTML Wrapper: The sender sends an email, it is stored at an intermediate server and that intermediate server sends an email with an HTML file attached, the HTML file being large as it contains the message and all attachments encrypted. When a recipient clicks on the HTML file, it often brings the recipient to a webpage to sign-up for an account. After going through several required steps, the message is transmitted back from the recipient (from the HTML Wrapper file) to the sending server (or intermediate server), and then displayed in a browser from the sending server (or intermediate server), for the recipient to view and download the originally sent message.

File Sharing: Systems that require the user/sender to upload a document to an online storage area, and then invite a recipient to have access to the online folder to view and download the file often with a required recipient password or account access.

The above methods of transmitting an electronic message in a more secure manner than a standard email message is a short summary of a variety of methods used and is not intended to be an exhaustive description of any one protocol or method, and there are others that may be used.

With heightened awareness of information privacy breaches, and government concern for protecting sensitive non-public consumer information, regulators have created data privacy regulations that require senders or sending organizations to use methods of transmission that protect the transmitted information from inadvertent disclosure to unintended recipients, eavesdroppers, or Internet thieves.

While these regulations generally do not specify a specific method of delivery, they generally do speak to the need to use methods to ensure privacy of transmitted information, and some, to maintain audit-ready records to demonstrate methods were used to ensure privacy of transmitted information.

One of the main Federal data privacy regulations in the United States is HIPAA. In Europe, the General Data Protection Regulation (GDPR), Regulation ((European Union (EU)) 2016/679) goes further, emphasizing the importance of maintaining a record of 'proof of data privacy compliance'; better yet, automated, demonstrable proof on a message by message basis (as described in GDPR Article 5 Clause 1 & 2 and Article 32 Clause 1) as accountability is an important requirement of the GDPR directive. There is a trend of US state regulators and lawmakers in other countries outside of Europe adopting new privacy regulations modeled on Europe's GDPR regulations.

Due to regulations, more and more, businesses dealing with consumer information will be compelled not only to transmit information securely, but also to retain auditable proof of compliant, secure email delivery. For many businesses, new requirements will require them to change email encryption services altogether. Auditable proof of encryption compliance will be needed to deal with compliance audits and the potential of accusations of data breach; particularly when the fines prove to be as steep as the regulators have declared they will be.

Due to heighted sophistication of internet eavesdroppers and internet criminals, in their abilities to micro-target users or companies, businesses dealing with non-public strategic or regulated private (health-related or financial) will be compelled not only to transmit information securely, but also to retain visibility and tracking to verify whether systems designed to transmit information more securely did in fact transmit the message as a secure email delivery; and maintain auditable proof of compliant secure delivery. Users will desire to have visibility as to fact of encrypted delivery, receipt, or redaction of important content, as will compliance officers and system administrators. For many businesses, new requirements will require them to change email encryption services altogether. Auditable proof of encryption compliance will be needed to deal with compliance audits and the potential of accusations of data breach; particularly when the fines prove to be as steep as the regulators have declared they will be.

The main industries that will be targeted are those dealing with third-party consumer financial or health information—broadly speaking, those businesses dealing in consumer health care and financial services (banking, lending, investment advisory, insurance, residential real estate, and the like.), and in functional business areas, such as, human resources, finance, accounting, and customer service. Additionally, lawyers should be interested in the functionality of the redaction of content from the email reply, as it will protect from exposure of sensitive information and they generally are familiar with the term "redaction" from use redacting content in documents.

In particular, parts of GDPR emphasize the importance of maintaining records of encrypted delivery: Article 5 for security, confidentiality, and accountability, and Article 32 for encrypting and assessing the effectiveness of technical measures to ensure securing.

Article 5 Clause 1(f) calls for maintaining the confidentiality of personal data, stating, "personal data shall be processed in a manner that ensures appropriate security of the personal data . . . using appropriate technical or organizational measures ('integrity and confidentiality')".

Article 5 Clause 2 creates the need to maintain demonstrable proof of compliance with the confidential treatment of personal data, stating, "The controller shall be responsible for, and be able to demonstrate compliance with, paragraph 1 ('accountability')".

Article 32 Clause 1(a) specifies use of encryption to secure personal data, stating, "the controller and the processor shall implement appropriate technical and organizational measures to ensure a level of security appropriate to the risk, including inter alia as appropriate: (a) the pseudonymization and encryption of personal data". Article 32 Clause 1(d) calls for regular assessments to ensure the security of the processing, stating, "a process for regularly testing, assessing and evaluating the effectiveness of technical and organizational measures for ensuring the security of the processing."

There are many concerns one needs to consider in terms of protecting the privacy of transmitted electronic information:

Protect from Interception—protect the message in transit across the Internet, regardless of server, provider, or settings, at the recipient. This should also protect against common interception tactics that defeat standard TLS server sending, such as TLS Downgrade Attacks that are most successful when there is no built-in fall back to another encrypted delivery method if the recipient server always or intermittently reports that it cannot accept a TLS transmission.

Protect from Eavesdroppers—option to protect the message as it transfers from sender through sender organization and as it transfers through to the recipient destination. There are different categories of eavesdroppers—it could be curious staff inside a sender or receiver organization, Internet criminals, or practices of an outsourced provider that has access to email. In the latter example, consider if a recipient uses the Gmail® email system (Gmail is a registered trademark of Google LLC), and the sender's message is encrypted to the receiver's email provider (Gmail in this case). In this example, the receiver's provider offers a free email service known to rely on marketing user information. The message content at the receiver will be analyzed by the Google® corporation, with elements recorded, and a profile sold in the point of "improving" the service (aka the marketing profile of sender and/or recipient based on content of the email associated with the email addresses and other data collected).

Protect from Socially Engineered Leaks—a data protection plan should also consider how to protect from an imposter email received by human resources, finance, or other staff that deal in customer sensitive information, which lures them into replying with sensitive data attached. A common tactic is for an Internet criminal to pretend that they are an employee asking for benefits or tax information, by email to the human resource department, and the reply email is configured so the staff's reply with the information, unknowingly routes to the internet criminal. The technology industry calls this a "whaling" attack—a more socially engineered approach to "spear-phishing". The Federal Bureau of Investigation calls this a type of Business Email Compromise attack. The best solutions will detect for this type of socially engineered data leak.

Automated Rules—some may prefer the option for a sender to direct the server to encrypt a message using content added to the message before sending, such as a key word in the subject field, or based on matches of content in the message to content policies added at the server. This may be useful in certain situations.

And social elements of these means of transmitting information privately must also be considered; for example:

Simple Enough that it is Used—if the service is too complicated for the sender, the sender may ultimately not use the service. If the sender, for example, needs to engage in an encryption key or certificate exchange with the intended recipient, service use will be dramatically limited. Simplicity of use is essential in today's business environment.

Simple for Recipient, Avoids Complaints—if the service is cumbersome for the recipient, for example, mandating numerous steps to set up an account to retrieve messages, the receiver will naturally complain to the sender or may never pick up the sender's important message. This becomes critical when the sender is sending private information where they also need proof of delivery, for example information related to a customer account, investment risk disclosures, and the like. In these cases, uploading to a portal or sending a link with a complex process to retrieve will not likely deliver the information to the recipient, and may not constitute successful compliance with delivery or notification requirements.

Peace of Mind—providing the sender with proof of delivery, proof of fact of encrypted delivery; and providing the recipient with visible markings of fact that the sender elected to treat the information as sensitive and transmit it securely to the recipient. Simple use of TLS, for example, does neither of these.

No Storage—most companies prefer there not to be another location where messages are stored in transit as this creates another risk where the message may be breached. The intermediate storage server security should be monitored, and it creates a potential point for subsequent data access depending on the intermediate server's data retention and deletion techniques. For example, if one uses a file sharing service to transmit a sensitive document, users rarely return to delete the document after transmission. The document remains accessible at the shared link for an extended period. Also, link-retrieval secure e-delivery systems often store a copy on an intermediate server until the document is retrieved (and it may never be), for extended periods of time, or even if retrieved, may not have optimal deletion processes. These can unnecessarily expose sensitive data.

User Carelessness—protect from recipients replying to received sensitive information that they reply to leaving the sensitive data in the email thread with the reply transmitted insecurely or without the level of security the sender would have desired for that type of message or message content part.

Considering transmitting messages in a more secure manner, if doing so for compliance reasons (compliance with data privacy rules), one should consider how they may be able to maintain records of fact of encrypted delivery; how the sender may maintain audit-ready data privacy compliance proof. The General Data Protection Regulation (GDPR), Regulation ((EU) 2016/679), for example, calls for penalties of up to 4% of global turnover with a maximum of fine of 20 million Euros. Considering the potential of a fine tied to a percentage of global turnover, compliance consultants should educate their clients on the importance of maintaining a record of 'proof of data privacy compliance'; better yet, automated, demonstrable proof on a message by message basis as accountability is a key requirement of the GDPR directive. US and other state and country regulators are likely to follow these guidelines in the future. Industry groups are likely to develop industry best practices for secure data transport and proof of.

With the significance of GDPR fines for a data breach, it is imperative that the sender organization has audit-ready proof of fact of encrypted delivery, on a message by message basis. Simply having a "policy" in place does not mean the policy was functioning properly. For example, a policy may automate the transmission by TLS, but that does not mean that the message went by TLS (consider a TLS Downgrade Attack). It does not mean the server was functioning properly if looked back upon months or years later, when a dispute or breach is being investigated. Audit-ready evidence on a message-by-message basis is most desirable, and preferably if this is easily demonstrated in a compliance review, compliance audit, or in case there is an accusation of a data breach by a sender (which can happen if there is a data breach at the recipient's system or after a receiver forwards a message onward).

Many companies rely on TLS delivery to secure transmission, however, many companies and email service providers do not, or use what is considered in insecure version of TLS (i.e. TLS 1.0). As Microsoft Corporation reports in their Jan. 14, 2019 blog, they stopped supporting what is referred to as insecure TLS (TLS 1.0 and TLS 1.1) but will continue to delivery to recipients with these levels of TLS.

In the following description, numerous specific details are set forth in order to provide a thorough understanding of the present disclosure. It will be apparent, however, to one of ordinary skill in the art, that the present disclosure may be practiced without these specific details. In other instances, well known components or methods have not been described in detail but rather in a block diagram, or a schematic, in order to avoid unnecessarily obscuring the present disclosure. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present disclosure. The term "coupled" is defined as meaning connected either directly to the component or indirectly to the component through another component.

Throughout the description reference will be made to various software programs and hardware components that provide and carryout the features and functions of the various embodiments of the present disclosure. Software programs may be embedded onto a machine-readable medium. A machine-readable medium includes any mechanism that provides, stores or transmits information in a form readable by a machine, such as, for example, a computer, server or other such device. For example, a machine-readable medium includes read only memory (ROM); random access memory (RAM); magnetic disk storage media; optical storage media; flash memory devices; digital video disc (DVD); Erasable Programmable Read-Only Memory (EPROMs); Electrically Erasable Programmable Read-Only Memory (EEPROMs); flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, do not refer to the action and processes of a general purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the disclosure.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running, and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules and the like.

Similarly, a cloud server is a server that provides shared services to various clients that access the cloud server through a network, such as a local area network and the Internet. In a cloud-based system, the server is remote from the clients, and various clients share the resources of the cloud server. Information is passed to the server by the client, and returned back to the client through the network, usually the Internet.

Many senders use mail clients without a corporate Information Technology (IT) infrastructure where there can easily access a security gateway server or enable policy filtering rules so having this capability inside the sender mail client regardless of their email routing or email server is a novelty and huge benefit; vastly expands the market for policy filtering. Security gateway server cannot automate application of unique functionality where this can because the sender can opt to exit and send normally if the rule does not make sense for a particular message. The system (100) solves these problems as the sender can also proactively send encrypted or Send Registered, for example, the system can learn which messages the user self-selects to be processed this way and then add that learning so the Recommends engine running at the sender mail client can become smarter, more predictive. With the visible prompts, even including the rationale as to way the recommendation was invoked, the user learns over time; automates training. This helps maximize use which as a Software as a Service (SaaS) provided service, minimized churn (cancellations due to non-use).

The figures illustrate an exemplary computer system which may be used with some embodiments of the present invention, which may be, for example, a server or a client computer system. Computer system may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, and the like. Computer system may be a combination of multiple forms. Computer system 500 may include one or more computer systems, be unitary or distributed, span multiple locations, span multiple systems, or reside in a cloud (which may include one or more cloud components in one or more networks).

In one embodiment, computer system may include one or more processors, memory, storage, an input/output (I/O) interface, a communication interface, and a bus. Although this disclosure describes and illustrates a particular computer system having a particular number of particular components in a particular arrangement, this disclosure contemplates other forms of computer systems having any suitable number of components in any suitable arrangement.

In one embodiment, processor includes hardware for executing instructions, such as those making up software. Herein, reference to software may encompass one or more applications, byte code, one or more computer programs, one or more executable module or Application Programming Interface (API), one or more instructions, logic, machine code, one or more scripts, or source code, and or the like, where appropriate. As an example, and not by way of limitation, to execute instructions, processor may retrieve the instructions from an internal register, an internal cache, memory or storage; decode and execute them; and then write one or more results to an internal register, an internal cache, memory, or storage. In one embodiment, processor may include one or more internal caches for data, instructions, or addresses. Memory may be random access memory (RAM), static RAM, dynamic RAM or any other suitable memory. Storage may be a hard drive, a floppy disk drive, flash memory, an optical disk, magnetic tape, or any other form of storage device that can store data (including instructions for execution by a processor).

In one embodiment, storage may be mass storage for data or instructions which may include, but not limited to, a Hard Disc Drive (HDD), solid state drive, disk drive, flash memory, optical disc (such as a DVD, Compact Disk (CD), Blu-ray, and the like), magneto optical disc, magnetic tape, or any other hardware device which stores computer readable media, data and/or combinations thereof. Storage maybe be internal or external to computer system.

In one embodiment, input/output (I/O) interface includes hardware, software, or both for providing one or more interfaces for communication between computer system and one or more I/O devices. Computer system may have one or more of these I/O devices, where appropriate. As an example, but not by way of limitation, an I/O device may include one or more mouses, keyboards, keypads, cameras, microphones, monitors, displays, printers, scanners, speakers, cameras, touch screens, trackball, trackpad, biometric input device or sensor, or the like.

In still another embodiment, a communication interface includes hardware, software, or both providing one or more interfaces for communication between one or more computer systems or one or more networks. Communication interface may include a network interface controller (NIC) or a network adapter for communicating with an Ethernet or other wired-based network or a wireless NIC or wireless adapter for communications with a wireless network, such as a Wi-Fi network. In one embodiment, bus includes any hardware, software, or both, coupling components of a computer system to each other.

The figures are a graphical representation of an exemplary network that may be used to facilitate the various embodiments of the present invention. Server is operated by a services organization, and typically includes at least one processor, input and output equipment or devices, memory, storage, and a communication interface as discussed above. The server also operates under the control of specialized software programming commands that are designed to carry out the various processes described above. It should be understood that while the exemplary network is described in terms of a server operated by a services organization, the server could be operated by a third party hired by the services organization or under the control of the services organization. The server could also be operated by a third party independent of the services organization, which then provides information and/or data to the services organization from which the services organization may provide services to a client of the services organization.

A data storage device, which may be separate from the server, but not necessarily, may be accessible to the server, and may be used for storing date related to information and any other data related to operation of the various embodiments of the system and method described above. The data storage device may directly connect to the server, or it may be accessible to the server through a network or the Internet, the data storage device may also be a virtual storage device or memory located in the Cloud.

From the above, while it may be apparent that the various embodiments disclosed herein may be implemented by computers, servers or other processors that appear to be organized in a conventional distributed processing system architecture, the various embodiments disclosed herein are not conventional, because they bridge multiple remote information sources, such as legacy computer applications, legacy storage media and data resident on workstation storage, media, and also involve sophisticated analysis of various parts of an email message, as well as the methods, protocols, and communication pathways used to transmit and receive the email message. In fact, when the various embodiments of this disclosure are operated using computers, servers, and processors, those embodiments transform those computers, servers, and processors into specially programmed computer, servers, and processor in a way that improves not only the operation of the various hardware and software components of the system, but also significantly improve the transmission, receipt, and processing of email messages.

For the purposes of the invention, there are technologies known by those skilled in the art and the methods of implementing the invention will use technology components commonly used by those skilled in the art, and this description of the invention therefore does not describe these component technologies. These include use of:

1. Sender mail client
2. Sender mail server
3. Sender mail gateway
4. Email content filtering
5. Secure messaging service servers
6. Secure transmission protocols
7. Email encryption methods and protocols
8. Database logging and association
9. RPost® Registered Email service technology (patented) (RPost is a registered trademark of RPost Communications Limited)
10. RPost Registered Receipt authentication service technology (patented)
11. Hashing, Digital Signature, and Block Chain technologies
12. RPost SideNote service technology (patented)
13. Recipient mail gateways
14. Recipient mail servers
15. Recipient mail clients such as Microsoft® Outlook® or Gmail®
16. Parts of a message
    a. Message headers
    b. Message content
17. Message transmission protocols including secure message transmission protocols
18. Data reports provided by email
19. Web views of data reports
20. Encryption and authentication processes and protocols
21. Replies to received electronic messages
22. Use of software tools to extract content and create images of the content
23. Use of tools to create content that may be associated with HTML links, and self-extracting HTML links inserted into email
24. Associating information in databases
25. Operating software on web and email servers The term "email" used herein may refer to any electronic message type; the term "email protocol" may refer to any electronic data exchange protocol, and the term "electronic file" may refer to any file type.

The present disclosure envisages a system and method to generate recommendations and transform a message as well as a system and method for providing for a redacted reply message.

In one embodiment, the disclosure provides a system and method for a sender or sending organization to have prompts that provide them with recommendations, requests to use, or requirements to use certain functionality that they can opt to continue use and applying the recommendation or cancel or change the message. These recommendations would not be simple prompts or reminders, but would actually trigger technology that would implement the recommendation automatically. And, these recommendations, requests, or requirements could be static, loaded onto their system, dynamic, meaning modifiable by an administrator, or predictive, updating based on learning from the user's patterns and therefore be unique to each user and not uniform across an organization.

Examples of triggering technology that are capable of implementing the recommendation automatically are to apply certain types of message encryption based on the content of the message, processing the message in a transformed manner to automatically enable the recipient to receive it as a link, or a link to trigger a recipient e-signature process, or redacting content from the message, or changing the message recipient addresses structure, and the like.

Recommendation System

An embodiment of a system (100) to generate recommendations and transform a message, of the present disclosure is now being described in detail with reference to the FIGS. 1 to 4.

Figure 4:
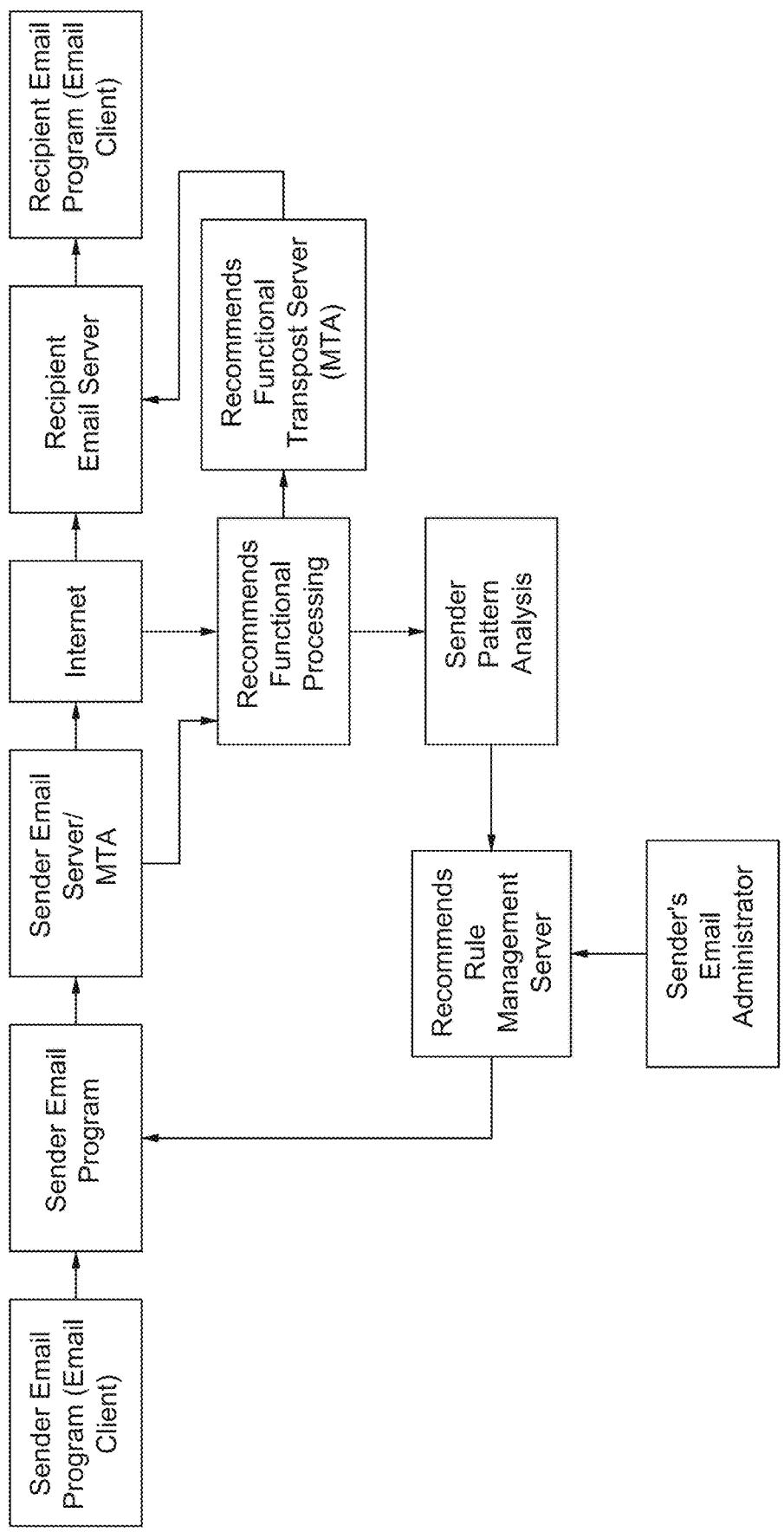
FIG. 4 is a detailed diagram of a system to generate recommendations and transform a message, in accordance with FIG. 1.

Referring to FIG. 1 and FIG. 4, in one embodiment, the system (100) may comprise an input module (102), a sender server (200) and a recipient's server (300).

In another embodiment, the sender server (200) may include a first repository (104), a recommendation module (106), a transformation module (108), a first communication module (110), a functionality module (112) and a replacing module (126).

By way of example, the recipient's server (300) may include a second communication module (114), a second repository (116), an editing module (118) and an analyzer (120).

In an embodiment, the user may be a sender or/and a receiver.

In an embodiment, the input module (102) may be configured to facilitate the user to provide inputs. In an embodiment, the input module (102) may be selected from the group consisting of, but not limited to, a keyboard, a touchscreen and a mouse.

The first repository (104) may be configured to store a set of pre-determined rules. In an embodiment, the rules are loaded in an XML (Extensible Markup Language) structure. An example of the rules stored is shown in FIG. 2.

In an embodiment, the recommendation module (106) may be configured to cooperate with the input module (102) and the first repository (104). The recommendation module (106) may include a matching module (122) and a prompt generator (124).

In an embodiment, the inputs received from the user in the form of the email rules may be matched with the stored rules by the matching module (122). The prompt generator (124), if there is a match, may generate a prompt. In and embodiment, the prompt may be a recommendation, a required action to take place or a request. The prompt may be displayed to the user.

An exemplified pseudo code for recommendation module (106) is as follows:

---

Select (Email Rules)
{
  If
  {
    Email Rules == Stored Rules
    Display (Prompt)

```
    }
  Else
    {
      Window.exit
    }
}
```

The transformation module (108) may be configured to cooperate with the recommendation module (106) to transform the message in the email, triggered by the prompt. In an embodiment, the message may be transformed by adding a header.

An exemplified pseudo code for transformation module (108) is as follows:

```
Select (email)
  {
  Do
    {
      Transform the message
    }
  While (triggered prompt)
  }
```

The first communication module (110) may be configured to cooperate with the transformation module (108) to transmit the transformed message to the recipient.

The replacing module (126) may be configured to cooperate with the transformation module (108) to replace the transformed message in the outbox with a copy of the untransformed message in the sent box with an indication that a function was applied to the message before sending.

An exemplified pseudo code for replacing module (126) is as follows:

```
Select (transformed message)
  {
  Read {
    Replace in the outbox with copy of untransformed message in the
  sent box
    }
  Write {
    Indicate a function
    }
  }
```

The functionality module (112) may be configured to cooperate with the transformation module (108) to encrypt the transformed message and change to an electronic signable message.

The second communication module (114) may be configured to receive the encrypted message at the recipient, and transmit to the recipient's server.

The second repository (116) may be configured to store the rules of the encrypted message.

The editing module (118) may be configured to cooperate with the second communication module (114) to add, verify, remove and change the rules.

The analyzer (120) may be configured to cooperate with the second communication module (114) to analyze, the patterns associated with which type of message content, message recipients, attachments, may be learned to update rules, if the sender has manual options to trigger a message to be sent encrypted or for e-sign or with other special functions The input module (102), the recommendation module (106), the transformation module (108), the functionality module (112), the editing module (118) and the analyzer (120) may be implemented using one or more processor(s).

The processor may be implemented as one or more microprocessors, microcomputers, microcontrollers, digital signal processors, central processing units, state machines, logic circuitries, and/or any device that manipulates signals based on operational instructions. Among other capabilities, the processor may be configured to fetch and execute the set of predetermined rules stored in the memory to control the operation of different modules/units of the system.

FIGS. 3A-3G illustrates different screenshots of the system (100).

In an embodiment, an application can be downloaded as system (100).

If a user composes and sends an email using the Outlook® "Send" button (send, reply, reply-all or forward, the application scans the email to look for key words and then recommends sending the email through system (100). This happens when on all email the SEND REGISTERED button is not selected.

The application scans the following locations to detect certain key words that are pre-programmed in the application but are editable:
  Email subject contains
  Email body contains
  Attachment name contains
  Attachment content contains
  Email header flag
  Attachment file type
  Email recipient address (this field is populated by end user in OPTIONS menu as specific to end user)
  Email recipient CC or BCC field used
  Other If these locations contain the key words, a pop-up will appear asking the sender if they would like to send the email using the system (100) with a feature recommendation.

Create a directory folder structure and text file structure for customers to manage, edit key trigger words. This should be set up in a way that a savvy end user or an administrator could customize/deploy the file to computers to load in rules. The structure must also consider different languages. This means the Application should only scan for trigger words in the language of the button.

The recommended structure is the Key words to be provided in system (100).

Precedence—If more than one key word or trigger is in the same email, then the order of precedence is as follows
  Encrypt-Message Level
  Encrypt-Transmission
  E-Sign
  Track
  Side Note
  Recommendation Pop-Up If the key words match the criteria, a pop-up called appears to indicate that the email should be sent using the system (100) at some capacity.
  Track and Prove
  Add the red circle R to the pop-up somewhere, on each of these. When clicking "OK" the message should be sent with via system (100) or normal, it should not prompt another pop-up. The following sequence is to be followed:
  Top bar text: RMail Recommends Track & Prove
  Title text: RMail recommends . . . TRACKING the delivery of this email. (bold)

Radio: Send using the RMail Track & Prove service
(default)
Radio: Send as a regular email
Checkbox: Disable RMail recommendations
See "Settings" section
OK (pre-highlighted)
Cancel
Encrypt—note, this would be for either transmission or message level encryption, but based on key word trigger, the appropriate version of encryption would be used. The following sequence is to be followed:
Top bar text: RMail Recommends Encrypt (not encryption as shown in the pop-up)
Title text: RMail recommends . . . ENCRYPTING this email. (bold)
Radio: Send using the Encrypt feature (default)
Radio: Send as a regular email
Checkbox: Disable RMail recommendations
OK (pre-highlighted)
Cancel
For Esign, the following sequence is to be followed:
Top bar text: RMail Recommends E-Sign
Title text: RMail recommends . . . sending this email for E-SIGN. (bold)
Radio: Send using the RMail E-Sign feature (default)
Radio: Send as a regular email
Checkbox: Disable RMail recommendations
OK (pre-highlighted)
Cancel
For Sidenote, the following sequence is to be followed:
Top bar text: RMail Recommends SideNote
Title text: RMail recommends . . . adding a note visible only to copied recipients. (bold)
Radio button:
  Send as a regular email (default)
  Send as an RMail Unmarked email with the SideNote below.
SideNote box with Cc/Bcc checkboxes with pre-populated text,
Send a private note only visible to the Cc and/or Bcc recipients
  Add your note
  Select recipient group
Checkbox: Disable RMail SideNote recommendations
Send (pre-highlighted)
Cancel
RMail Recommends Settings
Recommend Text & Notes

| Title: RMail Recommends | (bold and larger font) |
|---|---|
| Enable RMail Recommends | (bold) |
| Track & Prove | (checkbox-pre-checked) |
| Encrypt | (checkbox-pre-checked) |
| E-Sign | (checkbox-pre-checked) |
| SideNote (now shown) | (checkbox-pre-checked) |

(Note: When these are selected, key words will be used while scanning)
Always send by RMail to this address or domain:
  Dropdown
    Please Select (this will have four selections in drop down; Track & Prove, Encrypt Transmission, Encrypt Message Level, E-Sign)
    Track & Prove
    Encrypt Transmission
    Encrypt Message
    E-Sign
  SideNote
  Blank text box to insert email addresses or domains
  Add button
  Example: name@company.com, or company.com
  Text field to display all email addresses or domains. Note, (Track), (Encrypt Trans), (Encrypt Machine Language (ML), (E-Sign) will be at the end of the address or domain added depending on the feature dropdown.
RMail Recommends File Location
  Text field displaying the top-level Recommendation folder location for all the folders and files associated with this feature.
  Browse button
Additional Precedence Order
Content Rule
  Encrypt-Message Level
  Encrypt-Transmission
  E-Sign
  Track
  SideNote
Email address Settings
Domain in the Settings.

In many cases, a user does not have control over the gateway in their mail client. The above described system provides a way to prompt a user to include encryption or other control over the transmission of their electronic message. Depending on the key words discovered in the message, the system may prompt the user to apply an application to the message, such as, for example, to encrypt the message before sending the message to a recipient. The prompt may take various forms, as set forth above.

In another embodiment, the system includes a capability of monitoring the electronic messages sent by the sender, and, using an artificial intelligence or machine learning program, may build a model that can be automatically applied to a message depending on the intended recipient or recipients, and/or the subject matter or keywords of the body of the message.

For example, the system may learn that electronic messages to some recipients are sometimes encrypted. In such a case, the system may request that the message be encrypted. In another case, the system may learn that certain subject matter is always transmitted in encrypted form, and display a message to the sender that the message cannot be transmitted to a recipient unless the message is first encrypted. If the sender does not encrypt the message, the system prevents transmission of the message. Of course, various combination of recipients, subject matter, and/or key words may trigger different levels of prompts, requests, and requirements depending on the settings or the system.

Redacted Reply System

Figure 5:
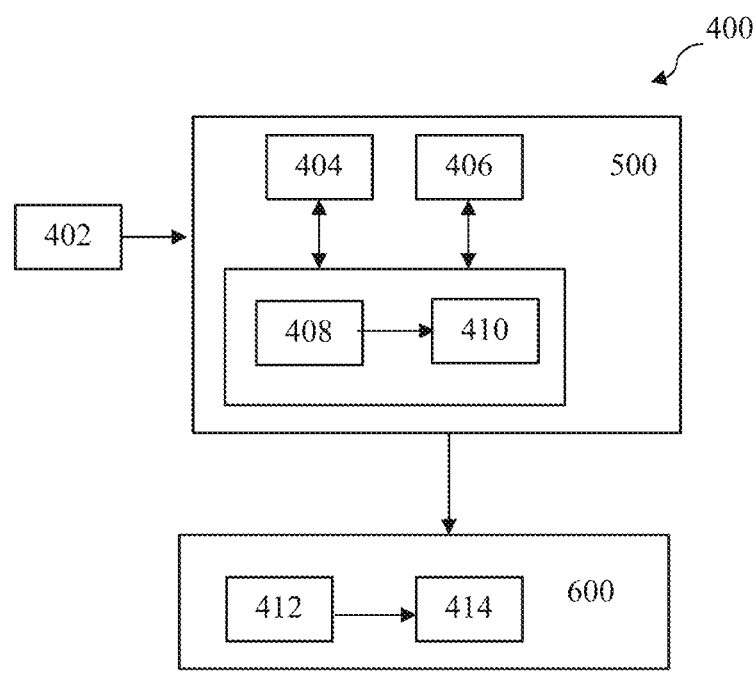
FIG. 5 is a schematic diagram of a system to provide a redacted reply service for an email message.

Referring to FIG. 5, system (400) may be configured to provide a redacted reply service for an email message, comprising a server remote from a recipient programmed to: receive a message containing content marked by a sender for redaction, determine that the message contains content marked for redaction, determine if there are any settings established by the sender of the message that are to be used in processing the received message, remove content marked for redaction in accordance with the determined settings, reformat the message according to the determined settings, transmit the reformatted message, and information associated with the removed content to the recipient. In another aspect, the server is further programmed to store the removed content in a repository stored in a memory. In still another aspect, the server is programmed to add a viewing limitation to the removed content to limit various parameters associated with viewing of the stored removed content. In another aspect, the transmitted information associated with the removed content is a link providing access to the removed content stored in the repository.

Figure 6:
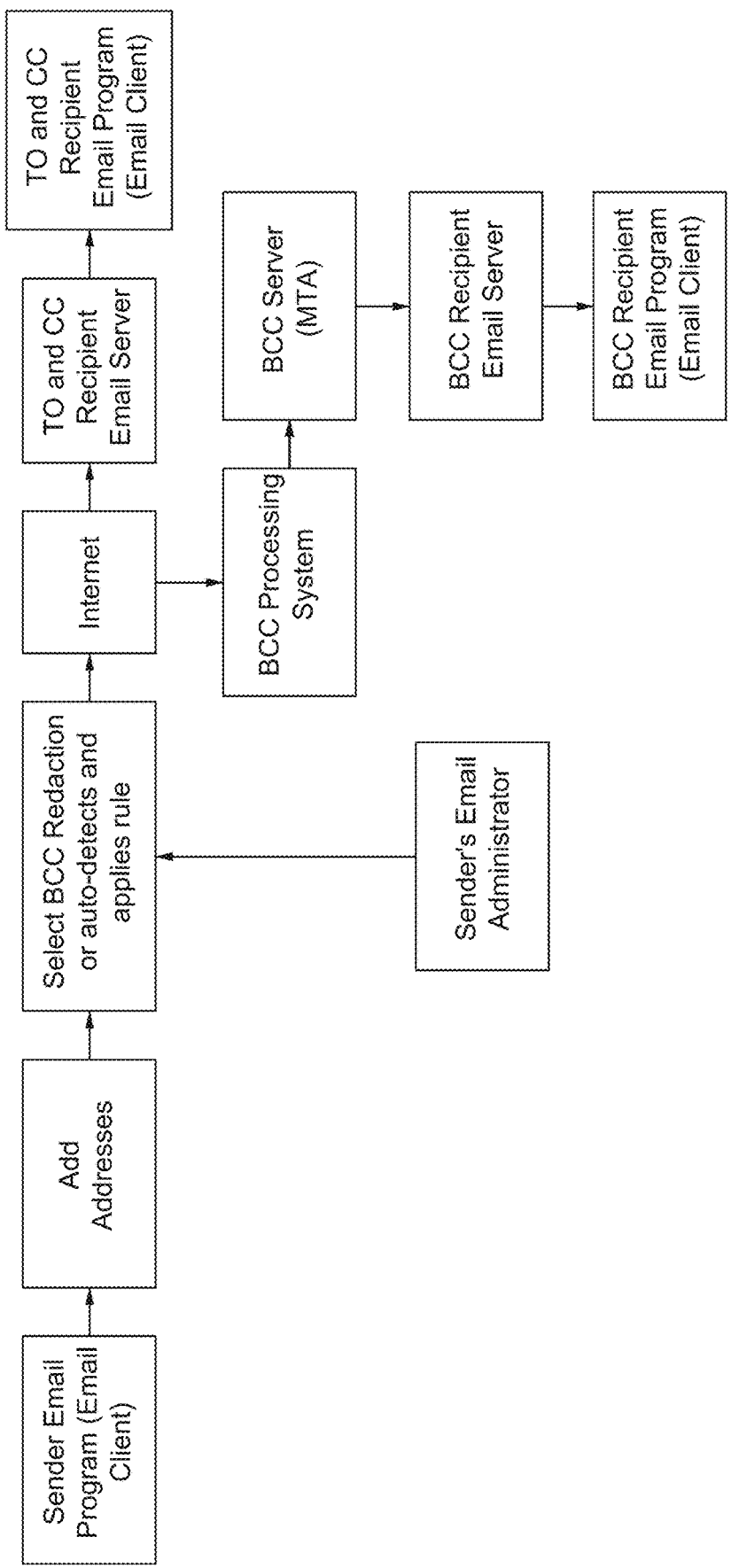
FIG. 6 is a detailed diagram of a system to provide a redacted reply service for an email message, in accordance with FIG. 5.

In an embodiment, system (400) provides a redacted reply service for an email message, of the present disclosure is now being described in detail with reference to the FIG. 5 and FIG. 6.

In an embodiment, the system (400) may comprise an input module, (402), a sender server (500) and a recipient's server (600).

In an embodiment, the sender server (500) may include a repository (404), a first communication module (406), a transformation module (408) and an edit module (410).

In an embodiment, the recipient's server (600) may include a second communication module (412) and a message module (414).

In an embodiment, the user may be a sender or/and a receiver.

In an embodiment, the input module (402) may be configured to facilitate the user to provide inputs. In an embodiment, the input module (402) may be selected from the group consisting of, but not limited to, a keyboard, a touchscreen and a mouse.

The user may be configured to compose an email and add addresses of the recipients, by providing inputs.

The repository (404) may be configured to store a set of pre-determined redacted BCC processing rules. In an embodiment, the rule can be to trigger the redacted BCC rule (recommend, request, require) at the sender server (500) or in a Security Gateway, or as an ad-hoc option ONLY IF there is (a) one or more BCC addresses, and (b) more than one TO or CC address.

The input module (402) may be configured to cooperate with the repository (404) to facilitate the user to select a redacted BCC processing rules. The user detects BCC in email and auto-applies Redacted BCC special processing.

The first communication module (406) may be configured to transmit the message in the composed email to the TO and CC addresses.

The transformation module (408) may be configured to cooperate with the input module (402) to remove from the message header the TO and CC addresses and printing the TO and CC addresses in the top of the body of the BCC message content (or appending in a text file) indicating which were TO and which were CC addresses.

The first communication module (406) may be configured to transmit the message in the composed email to the BCC addresses.

In an embodiment, the administrator through the edit module (410) can enable or change the rules, or require all BCCs to be processed with Redacted BCC processing.

The BCC recipient server (600) may be configured to receive the transformed BCC message with no other addresses in the headers/TO/CC fields, through the second communication module (412).

The message module (414) may be configured to cooperate with the second communication module (412) to put the message with BCC email client.

The input module (402), the first communication module (406), the transformation module (408), the edit module (410) and the message module (414) may be implemented using one or more processor(s).

When a recipient is the recipient of a message in which he/her is a BCC addressee, the system removes the TO and CC addresses from the message header and inserts into a portion of the body of the message. This insertion may be configured differently depending on the sender's settings. For example, the TO and CC addresses may be placed in a text file attached to the BCC message, a portion of the body of the message, or as a note added to the message body. In this way, if the BCC recipient clicks "REPLY ALL" in the message client, the reply will not be sent to the TO and CC addresses; it will only be sent to the original sender of the message. This prevents inadvertent, embarrassing, or confidential content from being sent to an unintended recipient. Such an inadvertent message would also "unmask" the identity of BCC recipient to all the other recipients of the message, a result clearly not desired by the original sender.

The processor may be implemented as one or more microprocessors, microcomputers, microcontrollers, digital signal processors, central processing units, state machines, logic circuitries, and/or any device that manipulates signals based on operational instructions. Among other capabilities, the processor may be configured to fetch and execute the set of predetermined rules stored in the memory to control the operation of different modules/units of the system.

In another embodiment, the disclosure includes a system that presents recommendations to an electronic messaging system user that, if the recommendation is accepted, automatically transforms the message to implement the recommendation, comprising; a processor or server programmed using software commands to: trigger recommendation in accordance with pre-set rules associated with message destinations, content, headers, or context, the recommendation happening at the user or system that interacts with the user, the pre-set rules being created or modified by the user, a remote administrator, or by machine learning from an external system to the user based on past user behaviors or messaging interactions, and to transform the message at the user or on a system external to the user before reaching the recipient destination, examples of transformation being to send a message structured to capture a recipient's electronic signature, applying different types of message encryption, redacting content from the message or disabling the reply-all possibility if BCC addresses are present, or other.

In yet another embodiment, the system of presents a request of a trainer or system administrator to the user in a way that trains the user on the requested transformation of the particular message based on the message destinations, content, headers or context, with the option for the user to accept and send with the requested or not.

In still another embodiment, the system presents requirements to the user in a way that trains the user on the required transformation of the particular message based on the message destinations, content, headers or context, with the option for the user to accept the requirement and if not be forced to cancel the send. In another embodiment, the message is processed based on the recommendation if accepted, request if accepted, or requirement if sent. In still another embodiment, the system is configured to learn and adapt based on machine learning or analysis of each user patterns based on messages sent.

In yet another embodiment, the system, if recipient fields (or addresses or other) for example, if there is a CC or BCC in the message, and other addresses to the same message, the processor or server is programmed to transform the message such that all the addresses other than the From address are removed from the message headers and are populated as a text attachment or into re-formatted message body with the location to place the removed recipient addresses, so that each recipient cannot reply-all to the removed addresses but can visibly see that the original message was sent to the other addresses. In another embodiment, all or a portion of the addresses, based on a category of addresses (i.e. internal company vs external domain) are removed. In still another embodiment, the restructuring of the message format, the processor or server is programmed to add a link in the restructured message associated with each recipient address.

In yet another embodiment, the message link records, from a system to the recipient and user, information about delivery of the message to each of the removed addresses, so the recipient that receives the transformed message can see who each recipient was, along with having assurance of successful delivery with a display of actual delivery to each of the recipients that display from information at the link associated with each recipient that was redacted from the message headers.

Technical Advancements and Economical Significance

The present disclosure described herein above has several technical advantages including, but not limited to, the realization of, a system and method to generate recommendations and transform a message, that:
- provide a sender or sender organization visibility and proof of fact of encrypted delivery for peace of mind or protection in the case of privacy compliance audit, and visibility and proof of fact of receipt of an inbound message having been transmitted with encrypted delivery from the sender or sender agent;
- provide audit-ready records to verify secure delivery of electronic messages to better manage messaging policies and to provide readily accessible information in case of a data privacy compliance audit;
- offer a sender or sending organization (or a receiver or a receiver replying) with a record of fact of encrypted delivery of an electronic message from one endpoint to a receiving endpoint;
- give a means for third parties to authenticate the record of fact of private delivery;
- creates a record to provide the sender of a message opportunities to make a reply to the sender's message returned in a more private manner (so as not to expose the content or a part of the sender's original information sent if contained in the reply message thread);
- give means for the sender or third parties to authenticate the record of fact of certain content sent having been redacted or removed from a recipient's reply message thread;
- add a link to the transmitted reformatted message that includes reply control information that limits the content that a reply message based on the transmitted reformatted message may contain; and
- controls information and prevents the reply from including the information associated with the removed content.

In an embodiment, the present disclosure also includes a system and method to provide a redacted reply service for an email message.

In an embodiment, the present disclosure also includes a system and method for providing proof that an electronic message has been delivered and viewed by a recipient of the message. For example, in one embodiment, such a system can be described thus:

The California Statute for Self Storage Lien Notices, in pertinent part, sets forth that:

(2) An owner may demonstrate actual delivery and receipt by any of the following:

(A) The occupant acknowledges receipt of the electronic transmission of the document by executing an electronic signature, which is defined as an electronic sound, symbol, or process attached to, or logically associated with, an electronic record and executed or adopted by a person with the intent to sign the electronic record.

(B) The document is posted on the owner's secure internet web site, and there is evidence demonstrating that the occupant logged onto the licensee's secure internet website and downloaded, printed, viewed, or otherwise acknowledged receipt of the document.

(C) The document is transmitted to the occupant through an application on an internet website that is secured by password, biometric identifier, or other technology, and there is evidence demonstrating that the occupant logged into the application and viewed or otherwise acknowledged receipt of the document.

(D) The occupant acknowledges receipt of the electronic transmission of the document by replying to the electronic mail communication, and there is delivery path evidence that the reply email was sent from the occupant's email address.

Using the various systems and methods disclosed herein, such proof as exemplified by the California statute, and in compliance therewith, may be obtained. In one example, In step 1, a User is activated with the new feature called the "ViewProof™ Service" in RPortal (new tab in RPortal settings)

In step 2, The user sends an email using the RPost Registered Email™ service send API, App, or SMTP service with the service. The sent message includes ^ and ^ at the beginning of the ViewProof text sections.

In step 3, the recipient of the message sees the incoming email is as a Registered Email message which increases awareness of the importance. In some embodiments, there may be custom text at the top of the email body with information about why they received the email. In another embodiment, the text inside the ^ and ^ may be extracted and replaced with a configurable text string, such as, for example, "Click to Continue Reading this Important Notice".

In step 4, the User clicks the "Click to Continue" button which opens a new tab on the web browser which pulls the extracted email body text from the server to view. In some embodiments, the Web page that opens may be, for example, branded for the sender organization with their logo in the top right corner. In some embodiments, a ViewProof link may be configurable in RPortal for expiration based on either the number of max days or number of max clicks desired by sender. A max days value may be, for example, 90 days. The Date and time of first viewing of the message by the recipient are recorded in a receipt that is generated with a "Delivered and Viewed" text or heading of the receipt. In an embodiment, there may also be a service icon of an eye in the services section of the receipt. In one embodiment, forensics related to the message's transmission, delivery, and viewing by the recipient may also be included (for example, UTC (Coordinated Universal Time) time of viewing, Internet Protocol (IP) address at viewing, email address of viewing invitation, other internet forensics around delivery)

In step 5, a Registered Receipt record is prepared for long term proof including, for example, the Original content of the message; extracted content; content encrypted (if original message was sent Registered Encrypted™ feature); and Authentication data.

In step 6, an Authenticated Receipt, using, for example, the RMail Registered Receipt system, will extract and validate the transmission, content, and View Proof content at any time in the future.

The various embodiments described herein may be implemented as a whole, or only in select parts. For the purpose of this disclosure, consider implementing for each part, in one embodiment, of which there are others that a skilled practitioner would identify as within the spirit of the invention.

Although the disclosed system has been described hereinabove with reference to certain examples or embodiments, various additions, deletions, alterations and modifications may be made to those described examples and embodiments without departing from the intended spirit and scope of the disclosed system and method for verification of encrypted electronic message delivery and preventing accidental disclosure of sensitive message parts in replies. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any embodiment or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims. The disclosure is limited only by the scope of the appended claims.

I claim:

1. A system that presents recommendations to an electronic messaging system user that, when a recommendation is accepted by the electronic messaging system user, automatically transforms a message to implement the recommendation, comprising:
 a processor programmed using software commands to:
 receive input from the electronic messaging system user to create an electronic message to be sent to one or more recipient destination addresses, the one or more recipient destination addresses contained in one or more electronic message headers of the created electronic message,
 the received input being analyzed by the processor in accordance with pre-set rules associated with message destinations, content, headers, or context,
 the pre-set rules being created or modified by the electronic messaging system user, a remote administrator, or by machine learning from a system external to the electronic messaging system user based on past behaviors or messaging interactions of the electronic messaging system user, and when at least one of the pre-set rules is satisfied, displaying at least one recommendation related to additional processing of the created electronic message to the electronic messaging system user,
 which if the at least one recommendation is accepted by the electronic messaging system user, the processor, in accordance with the accepted at least one recommendation,
 transforms the electronic message at the electronic messaging system user or at the system external to the electronic messaging system user before reaching the one or more recipient destination addresses by changing a structure of the one or more recipient destination addresses of the electronic message and replacing the one or more recipient destination addresses with the one or more recipient destination addresses having the changed structure and sends the transformed electronic message towards at least one of the one or more recipient destination addresses; and
 if the at least one recommendation is not accepted by the electronic messaging system user, the processor sends an untransformed electronic message to the one or more recipient destination addresses;
 wherein the processor places the replaced one or more destination addresses into a text attachment associated with the transformed electronic message;
 wherein the replaced one or more destination addresses in the text attachment are the TO and/or Carbon Copy (CC) addresses and the text attachment is included in or attached to a version of the transformed electronic message being presented to a Blind Carbon Copy (BCC) address or BCC addresses.

2. The system of claim 1, wherein the processor is also programmed to transform the electronic message by modifying the electronic message by adding triggering technology to the electronic message to take one or more actions included in a group of actions consisting of adding a link to trigger a recipient e-signature process, applying different types of message encryption to the electronic message, applying a tracking feature to the electronic message to report delivery of the transformed electronic message, and disabling a reply-all transmission feature when a BCC (blind carbon copy) address is present in the electronic message.

3. The system of claim 1, wherein the processor is configured using software commands to train the electronic messaging system user concerning a type of recommendation based on the message destinations, the content, the headers or the context of the electronic message that should be used when creating the electronic message by displaying the at least one recommendation to the electronic messaging system user during creation of the electronic message automatically based on the message destinations, the content, the headers or the context,
 the displayed at least one recommendation including an option to accept the at least one recommendation and send the transformed electronic message to the one or more recipient destination addresses or to cancel transmission of the electronic message to the one or more recipient destination addresses.

4. The system of claim 3, wherein the transformed electronic message is processed by the processor based on the request when accepted.

5. The system of claim 1, wherein the processor displays requirements to the electronic messaging system user on transformation of a particular electronic message based on the message destinations, the content, the headers or the context, with an option for the electronic messaging system user to accept the transformation or be forced to cancel sending of the particular electronic message.

6. The system of claim 5, wherein the particular electronic message is processed by the processor based on the requirements when sent.

7. The system of claim 1, wherein the system is configured to learn and adapt based on the machine learning or analysis of a user's patterns determined from an analysis of messages sent by the electronic messaging system user.

8. The system of claim 1, wherein all or a portion of the one or more recipient destination addresses, based on a category of addresses are removed.

9. The system of claim 8, wherein the category is associated with an internal company domain.

10. The system of claim 8, wherein the category is associated with an external domain.

11. The system of claim 1, wherein the processor is programmed using software programming commands to restructure a message format of the electronic message by adding a particular link in the electronic message associated with each particular recipient address in the electronic message.

12. The system of claim 11, wherein the particular link records, from a system to a particular recipient and the electronic messaging system user, information about delivery of the electronic message to each particular recipient address.

13. The system of claim 12, wherein the transformed electronic message received by the particular recipient address contains delivery information including an address of each particular recipient of the transformed electronic message.

\* \* \* \* \*